(12) United States Patent
Bonkowski

(10) Patent No.: US 10,135,880 B2
(45) Date of Patent: *Nov. 20, 2018

(54) CONTROLLING TELEPHONE CALL PROCESSING USING GLOBAL SIGNALING CODES

(71) Applicant: International Business Machines Corporation, Armonk, NY (US)

(72) Inventor: Edward F. Bonkowski, Bartlett, IL (US)

(73) Assignee: International Business Machines Corporation, Armonk, NY (US)

( * ) Notice: Subject to any disclaimer, the term of this patent is extended or adjusted under 35 U.S.C. 154(b) by 54 days.

This patent is subject to a terminal disclaimer.

(21) Appl. No.: 14/933,190

(22) Filed: Nov. 5, 2015

(65) Prior Publication Data

US 2016/0057176 A1 Feb. 25, 2016

Related U.S. Application Data

(63) Continuation of application No. 12/826,912, filed on Jun. 30, 2010, now Pat. No. 9,246,952.

(51) Int. Cl.
*H04L 12/66* (2006.01)
*H04L 29/06* (2006.01)
(Continued)

(52) U.S. Cl.
CPC ........ *H04L 65/1069* (2013.01); *H04L 61/308* (2013.01); *H04L 65/104* (2013.01); *H04L 65/1006* (2013.01); *H04L 67/18* (2013.01); *H04M 3/4365* (2013.01); *H04M 3/53366* (2013.01)

(58) Field of Classification Search
CPC .................. H04L 65/1006; H04L 65/104
See application file for complete search history.

(56) References Cited

U.S. PATENT DOCUMENTS 5,553,129 A * 9/1996 Partridge, III ...... H04M 3/4228
379/114.02
6,754,325 B1 6/2004 Silver et al.
(Continued)

OTHER PUBLICATIONS

Justin N. Mullen, USPTO Office Action, U.S. Appl. No. 12/826,912, dated Nov. 27, 2012, 13 pages.
(Continued)

*Primary Examiner* — Luat Phung
(74) *Attorney, Agent, or Firm* — William H. Hartwell; Maxine L. Barasch; Keohane & D'Alessandro PLLC

(57) ABSTRACT

In general, embodiments of the present invention involve attaching (e.g., pre-fixing) a Global Signaling Code (GSC) to a called party's telephone number thereby creating a modified Uniform Resource Indicator (URI). This modified URI is then sent in the "TO:" header of a SIP INVITE. The GSC will typically include a geographic indicator corresponding to a geographic location of a caller and a treatment indicator corresponding to a desired treatment of the call. The call will be routed based on the geographic indicator and treated according to the treatment indicator. Illustrative treatments for the call include (among others) voice mail avoidance, a preferred compression scheme for the call, etc.

20 Claims, 3 Drawing Sheets

(51) Int. Cl.
*H04L 29/12* (2006.01)
*H04L 29/08* (2006.01)
*H04M 3/436* (2006.01)
*H04M 3/533* (2006.01)

(56) References Cited

U.S. PATENT DOCUMENTS

| | | |
|---|---|---|
| 7,082,192 B2 | 7/2006 | Weaver |
| 7,088,810 B1 | 8/2006 | Burg |
| 7,443,973 B2 | 10/2008 | Nguyen et al. |
| 7,529,359 B2 | 5/2009 | Gallant et al. |
| 7,664,248 B2 | 2/2010 | Pearson |
| 8,238,529 B1 | 8/2012 | Moore et al. |
| 2002/0057786 A1 | 5/2002 | Donovan et al. |
| 2002/0114431 A1 | 8/2002 | McBride et al. |
| 2002/0146105 A1 | 10/2002 | McIntyre |
| 2002/0165969 A1 | 11/2002 | Gallant |
| 2002/0199203 A1 | 12/2002 | Duffy et al. |
| 2003/0081746 A1 | 5/2003 | Ahlstrom et al. |
| 2008/0062964 A1 | 3/2008 | Kumarasamy et al. |
| 2009/0238353 A1 | 9/2009 | Mani |
| 2010/0002690 A1* | 1/2010 | Schulzrinne ...... H04L 29/08072 370/352 |
| 2010/0091974 A1 | 4/2010 | Kent, Jr. et al. |
| 2011/0249666 A1* | 10/2011 | Holbrook ............... H04L 67/18 370/352 |

OTHER PUBLICATIONS

Luat Phung, USPTO Final Office Action, U.S. Appl. No. 12/826,912, Notification dated Sep. 17, 2013, 13 pages.

Luat Phung, USPTO Office Action, U.S. Appl. No. 12/826,912, Notification dated May 8, 2015, 12 pages.

Luat Phung, USPTO Notice of Allowance and Fee(s) Due, U.S. Appl. No. 12/826,912, dated Sep. 16, 2015, 11 pages.

* cited by examiner

CONTROLLING TELEPHONE CALL PROCESSING USING GLOBAL SIGNALING CODES The present patent document is a continuation of U.S. patent application Ser. No. 12/826,912, filed Jun. 30, 2010, entitled "CONTROLLING TELEPHONE CALL PROCESSING USING GLOBAL SIGNALING CODES", the disclosure of which is incorporated herein by reference.

TECHNICAL FIELD

The present invention generally relates to telephone call processing. Specifically, the present invention relates to the controlling of telephone call processing using Global Signaling Codes (GSCs).

BACKGROUND

As more complex voice and data solutions are implemented, there is a growing desire to receive increased functionality. A trend in recent years is to provide telephony services over the internet. This is commonly referred to as Voice-over Internet Protocol or (VoIP). A protocol used to implement VoIP is Session Initiated Protocol (SIP). SIP is an Internet Engineering Task Force (IETF®)-defined signaling protocol, widely used for controlling multimedia communication sessions such as voice and video calls over IP (IETF is a trademark of The Trustees of the IETF TRUST in the United States and/or other countries). The protocol can be used for creating, modifying, and terminating two-party (i.e., unicast) or multiparty (i.e., multicast) sessions consisting of one or several media streams. The modification can involve changing addresses or ports, inviting more participants, and adding or deleting media streams. Under SIP nomenclature, placing of a call is a type of SIP transaction commonly referred to as a SIP INVITE. Typically, the SIP INVITE includes a "TO:" header that lists the destination telephone number. Since VoIP is still an emerging technology, there exists a need for more robust functionality, and leveraging of SIP technology.

SUMMARY

In general, embodiments of the present invention involve attaching (e.g., pre-fixing) a Global Signaling Code (GSC) to a called party's telephone number, thereby creating a modified Uniform Resource Indicator (URI). This modified URI is then sent in the "TO:" header of a SIP INVITE. The GSC will typically include a geographic indicator corresponding to a geographic location of a caller and a treatment indicator corresponding to a desired treatment of the call. The call will be routed based on the geographic indicator and treated according to the treatment indicator. Illustrative treatments for the call include (among others) voice mail avoidance, a preferred compression scheme for the call, etc.

A first aspect of the present invention provides a method for controlling telephone call processing, comprising: attaching a global signaling code (GSC) to a telephone number dialed pursuant to a call to a desired destination, the GSC comprising a geographic indicator corresponding to a geographic location of a caller and a treatment indicator corresponding to a desired treatment of the call; routing the call to a carrier based to the geographic indicator; and handling the call according to the treatment indicator.

A second aspect of the present invention provides a system for controlling telephone call processing, comprising: a bus; a processor coupled to the bus; and a memory medium coupled to the bus, the memory medium comprising instructions to: attach a global signaling code (GSC) to a telephone number dialed pursuant to a call to a desired destination, the GSC comprising a geographic indicator corresponding to a geographic location of a caller and a treatment indicator corresponding to a desired treatment of the call; route the call to a carrier based to the geographic indicator; and handle the call according to the treatment indicator.

A third aspect of the present invention provides a computer program product for controlling telephone call processing, the computer program product comprising a computer readable storage media, and program instructions stored on the computer readable storage media, to: attach a global signaling code (GSC) to a telephone number dialed pursuant to a call to a desired destination, the GSC comprising a geographic indicator corresponding to a geographic location of a caller and a treatment indicator corresponding to a desired treatment of the call; route the call to a carrier based to the geographic indicator; and handle the call according to the treatment indicator.

A fourth aspect of the present invention provides a method for deploying a system for controlling telephone call processing, comprising: providing a computer infrastructure being operable to: attach a global signaling code (GSC) to a telephone number dialed pursuant to a call to a desired destination, the GSC comprising a geographic indicator corresponding to a geographic location of a caller and a treatment indicator corresponding to a desired treatment of the call; route the call to a carrier based to the geographic indicator; and handle the call according to the treatment indicator.

BRIEF DESCRIPTION OF THE DRAWINGS

These and other features of this invention will be more readily understood from the following detailed description of the various aspects of the invention taken in conjunction with the accompanying drawings in which.

Figure 1:
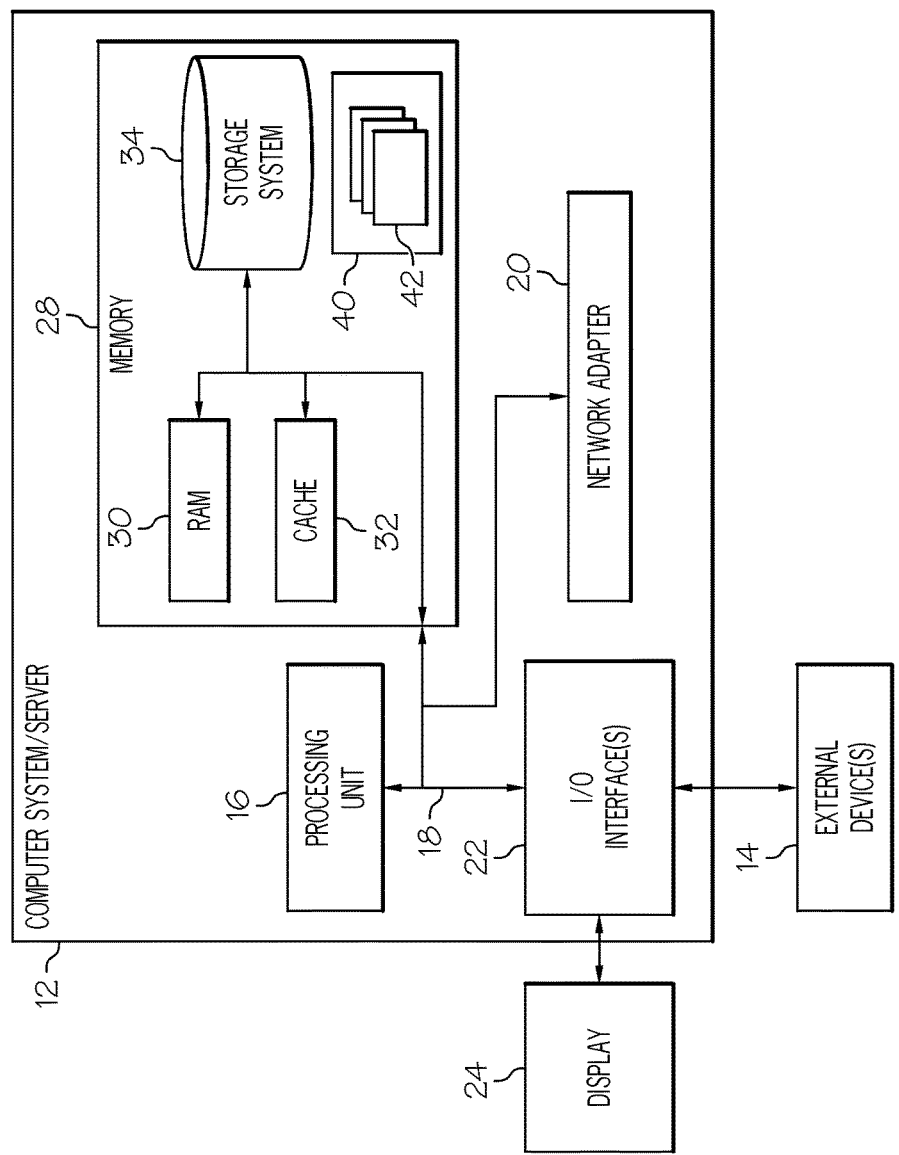
FIG. 1 depicts a computer system for controlling telephone call processing according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

In general, embodiments of the present invention involve attaching (e.g., pre-fixing) a Global Signaling Code (GSC) to a called party's telephone number thereby creating a modified Uniform Resource Indicator (URI). This modified URI is then sent in the "TO:" header of a SIP INVITE. The GSC will typically include a geographic indicator corresponding to a geographic location of a caller and a treatment indicator corresponding to a desired treatment of the call. The call will be routed based on the geographic indicator and treated according to the treatment indicator. Illustrative treatments for the call include (among others) voice mail avoidance, a preferred compression scheme for the call, etc.

Embodiments of the present invention presents using the Global Signaling Code as a mechanism for informing the SIP destination what kind of treatment to apply to the routed call as the called is completed to the called party. The call can be completed to an extension on an IP PBX, to a voice messaging system, or egress to a traditional telephony network.

Referring now to FIG. 1, a schematic of an example of a computer system for implementing the teachings recited herein is shown. Computer system 10 is only one example of a suitable computer system and is not intended to suggest any limitation as to the scope of use or functionality of embodiments of the invention described herein. Regardless, computer system 10 is capable of being implemented and/or performing any of the functionality set forth hereinabove.

In computer system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computer system 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

A computer readable signal medium may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein. For the purposes of this disclosure, program 40 is referred to as GSC program.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, Redundant Array of Independent Disks (RAID) systems, tape drives, and data archival storage systems, etc.

As indicated above, the present invention will leverage the use of a GSC pre-fixed to a destination telephone number to indicate a geographic region of the caller, and a desired treatment of the call. Along these lines, the destination telephone number is expressed as URI@DOMAIN within the "TO:" header of the SIP INVITE. The uniform Resource Indicator (URI) is the identity of the called party (e.g., a telephone number) and the DOMAIN is the name of the directory server that contains the fully qualified address of where the URI should be routed to on the Company's internal IP network. For a destination outside of a private IP network, previous embodiments call for a SIP Proxy to complete the call to a SIP gateway that egresses the telephone call to a PBX or to the Public Switched Telephone Network (PSTN). Only one type of call treatment is typically provided solely based on the URI. The conventional treatment is to provide call progress tones such as ringing or a busy signal. The called party may have configured other call treatments, such as routing the call to a voice messaging system on a busy or no answer condition. One limitation of this approach is that when the call reaches the called party, the call treatments are selected by the called party and are not under the control of the calling party. Accordingly, embodiments of the present invention allow the calling party at the time of call origination to select or specify one of several alternate call treatments to apply as the call is being terminated.

Figure 2:
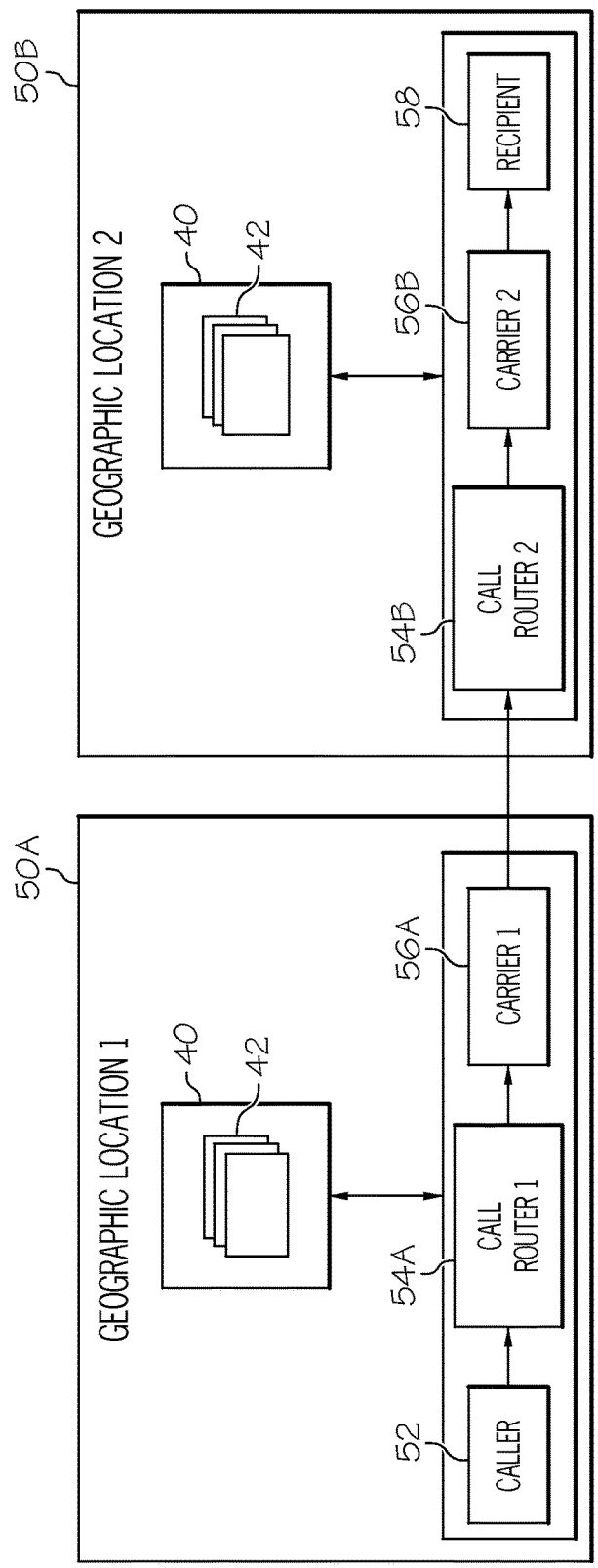
FIG. 2 depicts a process flow diagram according to embodiment of the present invention.

Referring now to FIG. 2, an illustrative process flow diagram according to the present invention is shown. Specifically, FIG. 2 shows the process involved with a caller 52 placing a call to a recipient 58. In the example shown in FIG. 2, caller 52 is in geographic location 50A while recipient 58 is in geographic location 50B. Under embodiments of the present invention, caller 52 dials a telephone number to place a call to a desired destination such a recipient 58. The call is received by call router 54A. At that point, modules 42 of GSC program 40 will attach a global signaling code (GSC) to the telephone number dialed pursuant to the call to recipient 58. Typically, the GSC is pre-fixed to the telephone number and comprises a geographic indicator corresponding to geographic location 50A and a treatment indicator corresponding to a desired treatment of the call. Router will interpret the geographic indicator and route the call to a carrier 56A that corresponds to geographic location 50A. Carrier 56A will then route the call to a call router 50B associated with the geographic location 50B and/or recipient 58. Call router 54B will then route the call to carrier 56B associated with geographic location 50B (e.g., as interpreted by modules 42 of GSC program 40). Although single points of ingress/egress are shown with respect to Carriers 56A-B in FIG. 2, this need not be the case. Rather multiple points can exist. For example, Carrier 1 could be the IBM® internal network or a common carrier network, and there could be multiple points of interconnection between Carrier 1 56A's network and Carrier 56B's network and the GSC is then used to pick the optimal interconnection point. The call may even have to transit through a third Carrier's (not shown) network to reach Carrier 56B. FIG. 2 has been shown with single ingress/egress points for simplicity purposes only. Regardless, modules 42 of GSC program will also interpret the treatment indicator to ensure that the call is handled according to the treatment desired by caller 52 handling the call according to the treatment indicator. Under the embodiment of the present invention, any type of treatment now known or later developed can be accommodated. Examples include implementing a desired compression scheme (e.g., single compression only) for the call, voice mail avoidance, "Find Me/Follow Me", or recipient locator avoidance, etc. Along these lines, the treatment indicator can be a numeric code that is cross-referenced by modules 42 against a digest or table of codes to determine the treatment corresponding thereto.

Some examples of the call treatment choices selectable by the calling party are as follows:

(A) Voice Mail Avoidance (1) The SIP Proxy routes the call to a SIP endpoint. If the SIP endpoint is an IP PBX on a company's private network, the call is typically connected to the called party by dialing an extension number. In the event of a busy/no answer condition, the called party typically has a call treatment in place that sends the calling party to a voice messaging system. With this invention, the calling party can use the GSC to override the call treatment selected by the called party. The caller can specify that camp-on is to be done. Camp-on would periodically check on the availability of the called party and when available would ring back the calling party to connect the calling party to the originally dialed called party. The calling party can then connect to the called party as soon as practical to discuss an important issue.

(2) The GSC would indicate to the terminating SIP endpoint that if the called party does not answer or is busy, the calling party does not wish to be forwarded to a voice messaging system. Rather embedded in the GSC is an alternate telephone number that would be dialed in the event of a busy or no answer condition on the first dialed number. The alternate telephone number could be a different person. It is not necessarily just an alternate number for the first person dialed. The caller specifies the number of the primary person and the number of the alternate person. The called party not knowing the nature of the call is not able to choose the proper alternate person. That decision is best left to the caller. The caller could just hang up and dial the alternate person, but having the call treatment do that automatically is a productivity saving to the caller.

(B) Recipient Locator Avoidance

Some voice messaging systems have been enhanced to provide a feature called Find Me/Follow Me which the called party can configure with various telephone numbers that the incoming call can be forwarded to in an attempt to connect the caller with the called party and avoid the voice message. For example IBM® Lotus® has developed a technology called SameTime® Unified Technology (SUT) (IBM, Lotus, SameTime and related terms are trademarks of IBM Corp. in the United States and/or other countries), an instant messaging application that can perform a "Fine Me/Follow Me" function. Under this technology, the incoming call to the called party is first routed to a SUT. If the alternate destinations configured by the called party are busy or do not answer, the SUT has a "final" destination consisting of the voice messaging system of the called party. In this case, the "Find Me/Follow Me" feature built in to the voice messaging system should not be used since that function has already been performed by the SUT. A special GSC could be used on the SIP INVITE sent by the SUT to the voice messaging system that instructs the voice messaging system to bypass the "Find Me/Follow Me" feature contained in the voice messaging system and connect the caller directly to the called party voice mailbox so a message can be left. Subjecting the caller to the "Find Me/Follow Me" dialogue is both confusing and time-consuming. That is avoided with the GSC. The "Find Me/Follow Me" feature on the voice messaging system may still be active and used by the called party in those situations where the incoming call cannot be sent to the SUT. This can occur when the SUT is out of service, or when the incoming call cannot be sent to the SUT because of limitations in the enterprise PBX that receives the incoming call. The GSC places the call treatment choice within the voice messaging system under the control of the SUT.

This scenario is representative of the entire class of sophisticated applications that generate SIP INVITES on behalf of the calling party where the application has the intelligence to manage the call treatments at the terminating end of the call. One of the main advantages of the GSC is that the basic URI of the called party is unchanged, and the different call treatments are totally under the control of the application. This results in a scheme that is very simple to provision in the application, which is efficient by offering time savings to the caller, which reduces errors since it is less confusing to the caller, and that lowers network cost by shortening the time it takes to complete the call.

Figure 3:
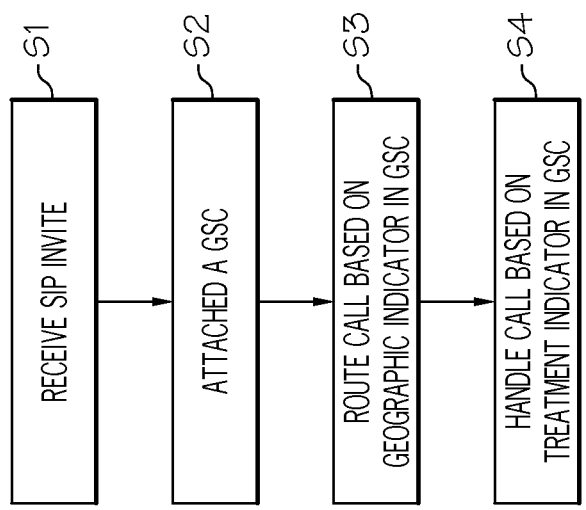
FIG. 3 depicts a method flow diagram according to an embodiment of the present invention.

Referring now to FIG. 3, a method flow diagram according to an embodiment of the present invention is shown. In step S1, a SIP INVITE is received. In step S2, a global signaling code (GSC) is attached to the telephone number dialed pursuant to the call. As mentioned, the GSC comprises a geographic indicator corresponding to a geographic location of a caller and a treatment indicator corresponding to a desired treatment of the call. In step S3, the call is routed to a carrier based to the geographic indicator. In step S4, the call is handled according to the treatment indicator.

While shown and described herein as a call processing control solution, it is understood that the invention further provides various alternative embodiments. For example, in one embodiment, the invention provides a computer-readable/useable medium that includes computer program code to enable a computer infrastructure to provide call processing control functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide call processing control functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for call processing control. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for controlling telephone call processing, comprising:
 receiving a Session Initiated Protocol (SIP) invite having a destination telephone number expressed in the form of URI@DOMAIN,
  wherein a URI, of the URI@DOMAN, is a uniform resource locator comprising a telephone number corresponding to a desired destination for a call, and
  wherein a DOMAIN, of the URI@DOMAIN, is the name of the directory server that contains an address of to where the URI should be routed on an IP network;
 attaching a global signaling code (GSC) as a pre-fix to the telephone number, the GSC comprising a geographic indicator corresponding to a geographic location of a caller and a treatment indicator corresponding to a desired treatment of the call, the desired treatment comprising avoiding a find me feature associated with the desired destination;

routing the call, after the attaching, to a carrier based on the geographic indicator;

detecting at least one of a busy signal or a no answer condition; and handling the call according to the treatment indicator by avoiding the find me feature associated with the desired destination.

2. The method of claim 1, the desired treatment further comprising avoiding a voice mail associated with the desired destination.

3. The method of claim 2, the handling further comprising placing the call on a camp-on status to avoid the voice mail.

4. The method of claim 2, the treatment indicator further comprising a pre-programmed alternate telephone number embedded therein, and the handling further comprising calling the alternate telephone number to avoid the voice mail.

5. The method of claim 1, the desired treatment corresponding to a compression scheme for the call.

6. The method of claim 1, further comprising routing the call to another carrier based on a geographic location of the desired destination.

7. The method of claim 1, wherein a solution service provider provides a computer infrastructure operable to perform the method.

8. A system for controlling telephone call processing, comprising:

a bus;

a processor coupled to the bus; and a memory medium coupled to the bus, the memory medium comprising instructions to:

receive a Session Initiated Protocol (SIP) invite having a destination telephone number expressed in the form of URI@DOMAIN, wherein a URI, of the URI@DOMAN, is a uniform resource locator comprising a telephone number corresponding to a desired destination for a call, and wherein a DOMAIN, of the URI@DOMAIN, is the name of the directory server that contains an address of to where the URI should be routed on an IP network;

attach a global signaling code (GSC) as a pre-fix to the telephone number, the GSC comprising a geographic indicator corresponding to a geographic location of a caller and a treatment indicator corresponding to a desired treatment of the call, the desired treatment comprising avoiding a find me feature associated with the desired destination;

route, after the attaching, the call to a carrier based on the geographic indicator;

detect at least one of a busy signal or a no answer condition; and handle the call according to the treatment indicator by avoiding the find me feature associated with the desired destination.

9. The system of claim 8, the desired treatment further comprising avoiding a voice mail associated with the desired destination.

10. The system of claim 9, the memory medium further comprising instructions to place the call on a camp-on status to avoid the voice mail.

11. The system of claim 9, the treatment indicator further comprising a pre-programmed alternate telephone number embedded therein, and the handling further comprising calling the alternate telephone number to avoid the voice mail.

12. The system of claim 8, the desired treatment corresponding to a compression scheme for the call.

13. The system of claim 8, the memory medium further comprising instructions to route the call to another carrier based on a geographic location of the desired destination.

14. A computer program product for controlling telephone call processing, the computer program product comprising a computer readable storage media, and program instructions stored on the computer readable storage media, to:

receive a Session Initiated Protocol (SIP) invite having a destination telephone number, for a call, expressed in the form of URI@DOMAIN, wherein a URI, of the URI@DOMAN, is a uniform resource locator comprising a telephone number corresponding to a desired destination for a call, and wherein a DOMAIN, of the URI@DOMAIN, is the name of the directory server that contains an address of to where the URI should be routed on an IP network;

attach a global signaling code (GSC) as a pre-fix to the telephone number, the GSC comprising a geographic indicator corresponding to a geographic location of a caller and a treatment indicator corresponding to a desired treatment of the call, the desired treatment comprising avoiding a find me feature associated with the desired destination;

route, after the attaching, the call to a carrier based on the geographic indicator;

detect at least one of a busy signal or a no answer condition; and handle the call according to the treatment indicator by avoiding the find me feature associated with the desired destination.

15. The computer program product of claim 14, the desired treatment further comprising avoiding a voice mail associated with the desired destination.

16. The computer program product of claim 15, further comprising program instructions stored on the computer readable storage media to place the call on a camp-on status to avoid the voice mail.

17. The computer program product of claim 15, the treatment indicator further comprising a pre-programmed alternate telephone number embedded therein.

18. The computer program product of claim 17, the handling comprising calling the alternate telephone number to avoid the voice mail.

19. The computer program product of claim 15, the desired treatment corresponding to a compression scheme for the call.

20. The computer program product of claim 15, further comprising program instructions stored on the computer readable storage media to route the call to another carrier based on a geographic location of the desired destination.

* * * * *